(12) United States Patent
Chen et al.

(10) Patent No.: US 9,912,182 B2
(45) Date of Patent: *Mar. 6, 2018

(54) ELECTRICAL CONNECTOR AND MOVABLE DEVICE USING THE SAME

(71) Applicant: CHIGOO INTERACTIVE TECHNOLOGY CO., LTD., Wuxi (CN)

(72) Inventors: Tao Chen, Wuxi (CN); Chuanrong Pan, Wuxi (CN); Weijian Lan, Wuxi (CN); Hua Zhou, Wuxi (CN)

(73) Assignee: CHIGOO INTERACTIVE TECHNOLOGY CO., LTD., Wuxi (CN)

( * ) Notice: Subject to any disclaimer, the term of this patent is extended or adjusted under 35 U.S.C. 154(b) by 34 days.

This patent is subject to a terminal disclaimer.

(21) Appl. No.: 14/760,340

(22) PCT Filed: Jan. 3, 2014

(86) PCT No.: PCT/CN2014/070097
§ 371 (c)(1),
(2) Date: Jul. 10, 2015

(87) PCT Pub. No.: WO2014/108047
PCT Pub. Date: Jul. 17, 2014

(65) Prior Publication Data
US 2015/0349564 A1    Dec. 3, 2015

(30) Foreign Application Priority Data
Jan. 10, 2013 (CN) ..................... 2013 2 0013022 U

(51) Int. Cl.
*H02J 7/00* (2006.01)
*H01R 27/02* (2006.01)
(Continued)

(52) U.S. Cl.
CPC ............ *H02J 7/0052* (2013.01); *H01R 24/68* (2013.01); *H01R 27/02* (2013.01); *H01R 31/02* (2013.01);
(Continued)

(58) Field of Classification Search
CPC ...................................... H02J 7/0052
(Continued)

(56) References Cited

U.S. PATENT DOCUMENTS 3,652,103 A    3/1972  Higgs
5,818,115 A *  10/1998 Nagao ..................... F02N 11/04
                                                180/65.1
(Continued)

FOREIGN PATENT DOCUMENTS

CN          1342120 A       3/2002
CN        201708414 U       1/2011
(Continued)

OTHER PUBLICATIONS

International Search Report Application No. PCT/CN2014/070097 Completion Date: Mar. 21, 2014; dated Apr. 22, 2014 6 pages.
(Continued)

*Primary Examiner* — Yalkew Fantu
(74) *Attorney, Agent, or Firm* — Forge IP, PLLC

(57) ABSTRACT

An electric connector, includes an insulated housing, a male plug at one end of the housing and a female socket on the opposite end of the housing. The male plug and female socket respectively have an electrode and an electrode slice which is electrically connected with a pair of the male plug and female socket inside the housing. The female socket has an opening adaptive to accommodate the male plug and enable a connection between the electrode of the male plug and that of the female socket. The invention also provides a movable device using the electric connector. According to
(Continued)

the invention, a plurality of movable devices with a charging unit can be charged simultaneously and the charging process can be simplified, thereby improving the utilization and safety of the movable devices and lowering the cost of maintenance.

9 Claims, 3 Drawing Sheets

(51) Int. Cl.
*H01R 31/02* (2006.01)
*H01R 24/68* (2011.01)
*H01R 103/00* (2006.01)
*B62B 3/14* (2006.01)

(52) U.S. Cl.
CPC .......... *H02J 7/0042* (2013.01); *H02J 7/0045* (2013.01); *B62B 3/14* (2013.01); *H01R 2103/00* (2013.01); *H02J 7/0013* (2013.01)

(58) Field of Classification Search
USPC ........................................... 320/116
See application file for complete search history.

(56) References Cited

U.S. PATENT DOCUMENTS

| | | | |
|---|---|---|---|
| 8,237,403 B2* | 8/2012 | Ishii | B60L 11/1803 320/112 |
| 2009/0247002 A1 | 10/2009 | Wu et al. | |
| 2010/0076615 A1* | 3/2010 | Daniel | F03D 9/00 700/293 |
| 2010/0217475 A1* | 8/2010 | Menze | B60R 16/03 701/31.4 |
| 2013/0335023 A1* | 12/2013 | Radin | B60L 11/1816 320/109 |
| 2015/0349557 A1* | 12/2015 | Chen | H02J 7/0045 320/120 |
| 2016/0272231 A1* | 9/2016 | Chen | F16M 11/10 |

FOREIGN PATENT DOCUMENTS

| | | | |
|---|---|---|---|
| CN | 203103711 U | | 7/2013 |
| DE | 102007039066 A1 | | 2/2009 |
| JP | 05-316607 A | * | 11/1993 |
| JP | 05316607 A | | 11/1993 |
| JP | H05316607 A | | 11/1993 |
| JP | H0982433 A | | 3/1997 |
| JP | 2007094915 A | | 4/2007 |
| JP | 3137411 U | | 11/2007 |
| KR | 101146773 B1 | | 5/2012 |
| KR | 101714947 B1 | | 3/2017 |

OTHER PUBLICATIONS

First Office Action in Counterpart JP Application No. 2015-551970 dated Oct. 10, 2017 4 pages.
European Search Report; dated Jul. 13, 2015 Application No. EP 14711672 Chigoo Interactive Technology Co., Ltd. 5 pages.
First Office Action issued in Korea, Application No. 10-2015-7021378 dated Jul. 15, 2016 Chigoo Interactive Technology Co., Ltd. 6 pages.

* cited by examiner

ELECTRICAL CONNECTOR AND MOVABLE DEVICE USING THE SAME

FIELD OF THE INVENTION

The invention relates generally to electric device, in particular to an electric connector and movable devices using the same.

BACKGROUND OF THE INVENTION

With the development of business and public services, movable devices like trolleys or luggage barrows which facilitate user's carry of luggage and goods have been widely used in public places such as shopping mall, supermarket, and airport. In order to enable users to access more information on consumption or other related information easily and timely, electronic playback devices are installed on the conventional trolley and luggage barrow so that users can get information and merchants can play location information, navigation information, advertising information and other related information. However, since charging of a conventional trolley has to rely on fixed external power plug, the number of trolleys being charged simultaneously is limited by the number of the external power plugs. For a large public place having thousands of trolleys, it is difficult to charge a number of trolleys simultaneously, which is inconvenient.

Furthermore, exposed power supply port on a trolley or luggage barrow is disadvantageous to the safe use thereof, and liable to cause inconvenience in operation.

In addition, the conventional charging method requires a large number of fixed external power plugs, which causes the management thereof inconvenient and uneconomical.

SUMMARY OF THE INVENTION

To solve at least one of above problems in the conventional art, an object of the invention is to provide an electric connector and a movable device using the same.

In one aspect, the invention may provide an electric connector comprising an insulated housing with a male plug provided at one end and a female socket provided at the opposite end thereof, each of the male plug and female socket having an electrode respectively, and electrode slices provided inside the housing and connected with a pair of male plug and female socket, the female socket having an opening being adaptive to accommodate the male plug and effecting a connection of the electrodes of the male plug and female socket which are spliced together.

In another aspect, the invention provides a movable device comprising a body, a charging unit installed on the body, and an electric connector as mentioned above, which is installed on the body and connected with the charging unit. When a plurality of the movable devices are in a queue, the male plug of a rear electric connector of movable device inserts into the female socket of its front movable device and forms an electric connection.

According to the invention, a plurality of movable devices can be easily charged simultaneously, while only take up a small space. The cost of appliance can be saved since only one external connector of power supply is needed, which is economical and convenient for charge and use of large quantities of movable devices in public place.

BRIEF DESCRIPTION OF THE DRAWINGS

The invention will be described in the following description in the form of some embodiments which are shown in the drawings, in which.

DETAILED DESCRIPTION OF THE INVENTION

To facilitate illustration and understanding, the following embodiments will be described taking trolley as an example of movable device. However, it would be appreciated by the skilled in the art that the embodiments of the invention are applicable to any movable devices similar to trolley.

Figure 1:
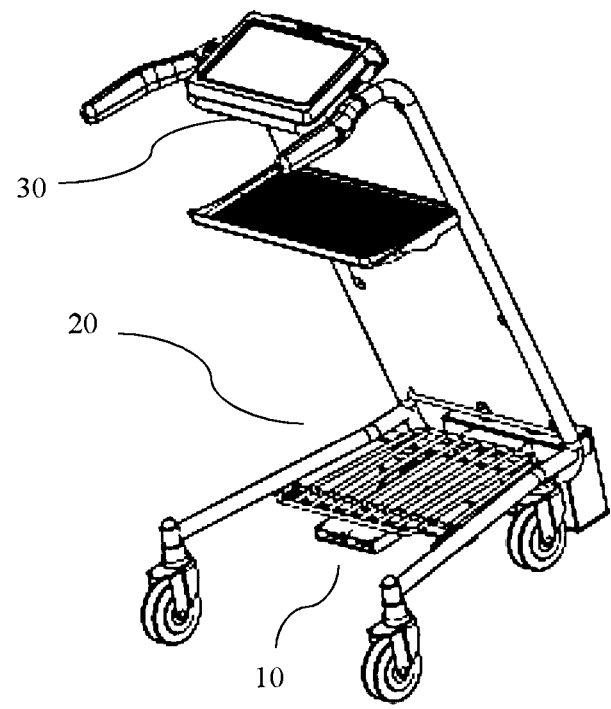
FIG. 1 is a schematic view of a trolley with an electronic equipment and an electric connector installed thereon according to an embodiment of the invention.

FIG. 1 is a schematic view of a trolley with electronic equipment and electric connector installed thereon according to an embodiment of the invention. The trolley comprises a body 20, a charging unit 30 installed on body 20, and an electric connector 10. Electric connector 10 is mounted on body 20 and connected to charging unit 30. As shown in FIG. 1, in this embodiment, electric connector 10 is provided at the bottoms of body 20.

Figure 2:
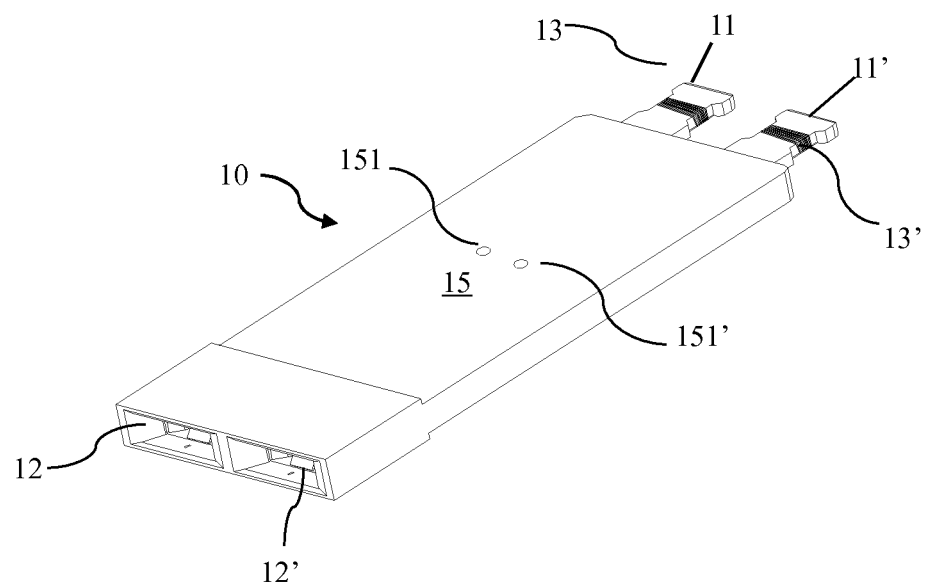
FIG. 2 is a schematic view of an electric connector according to an embodiment of the invention.

FIG. 2 shows an embodiment of electric connector in a trolley. As shown in FIG. 2, the electric connector 10 comprises an insulated housing 15, two male plugs 11, 11' and two female sockets 12, 12'. An electrode 13 is provided on male plug 11 and an electrode 13' is provided on male plug 11'. Female sockets 12, 12' are provided with openings respectively, each of which has a shape corresponding to male plugs 11, 11' to receive the male plugs. Charging ports 151, 151' are provided on housing 15 to allow a conductor wire of the charging unit to be inserted into charging connecting base 30.

Electrodes 13, 13' on the male plugs are formed by sheet metal (such as cooper sheet), each of which has a shape of "C" surrounding a central portion of the male plug.

Figure 3:
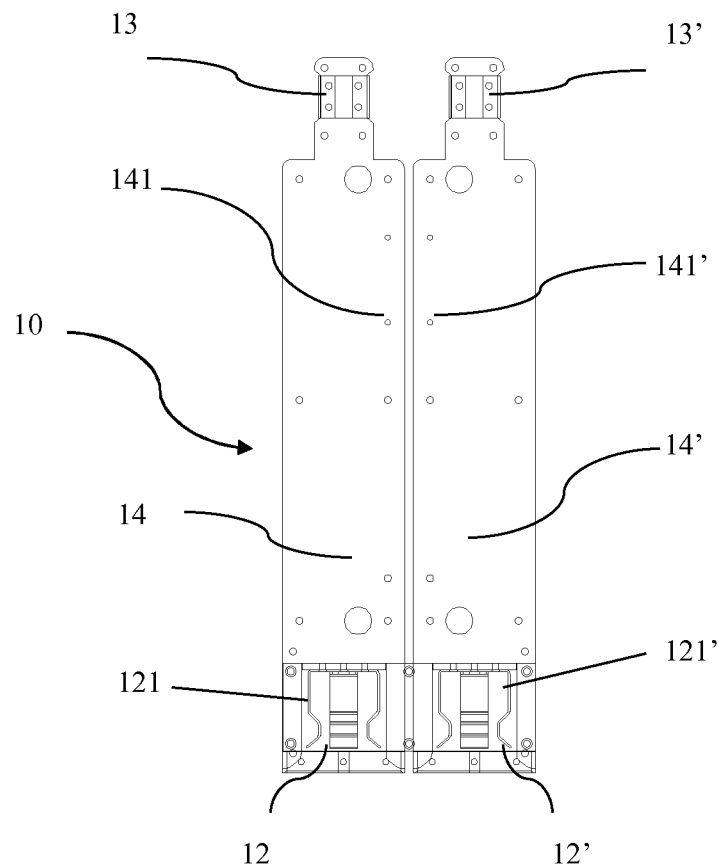
FIG. 3 is a schematic view of the internal structure of the electric connector as shown in FIG. 2.

FIG. 3 is a schematic view of the internal structure of electric connector 10. As shown in FIG. 3, housing 15 of electric connector 10 comprises two copper plating electrodes 14, 14' which are insulated with each other. One end of copper plating electrode slice 14 is connected with electrode 13, and the opposite end thereof is connected with a reed electrode 121 of female socket 12 for connection of three parts; one end of copper plating electrode slice 14' is connected with electrode 13', and the opposite end thereof is connected with a reed electrode 121' of female socket 12' for connection of three parts. Each of reed electrodes 121, 121' comprises a bottom part being electrically connected with the copper plating electrode slice, and elastic reeds extending respectively from the middle part and two sides of the bottom part. Three elastic reeds of reed electrode 121 match with electrode 13 of male plug 11, so that the three reed electrodes can clamp the electrode of an inserted male plug and form electric connection when its female sockets are inserted by the male plugs of the charging unit in another trolley. Electrodes of two male plugs 11, 11' are insulated with each other and so are electrodes of two female sockets 12, 12'.

Connection screw holes 141, 141' are provided on the copper plating electrode slices 14, 14' for insertion of power lines of charging unit 101. Connection screw holes 141, 141' are connected to charging ports 151, 151' of housing 15 for insertion of conductor wire.

Preferably, the interior of the electric connector is integrated with the housing 15, so that the whole electric connector can be solider.

Figure 4:
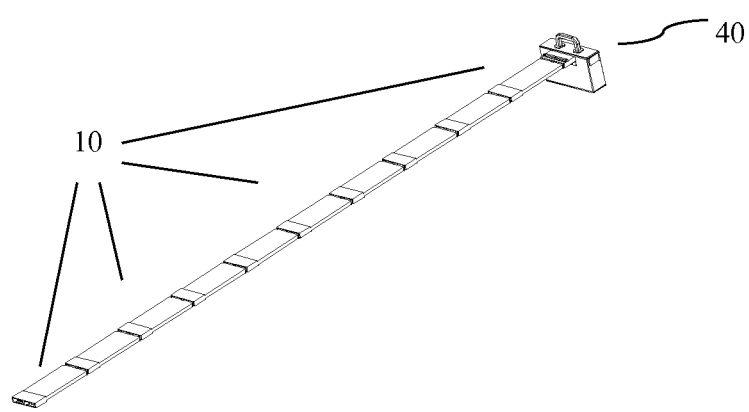
FIG. 4 shows a plurality of the electric connectors shown in FIG. 3 which are in tandem connection with each other and connect to an external charging power.
Figure 5:
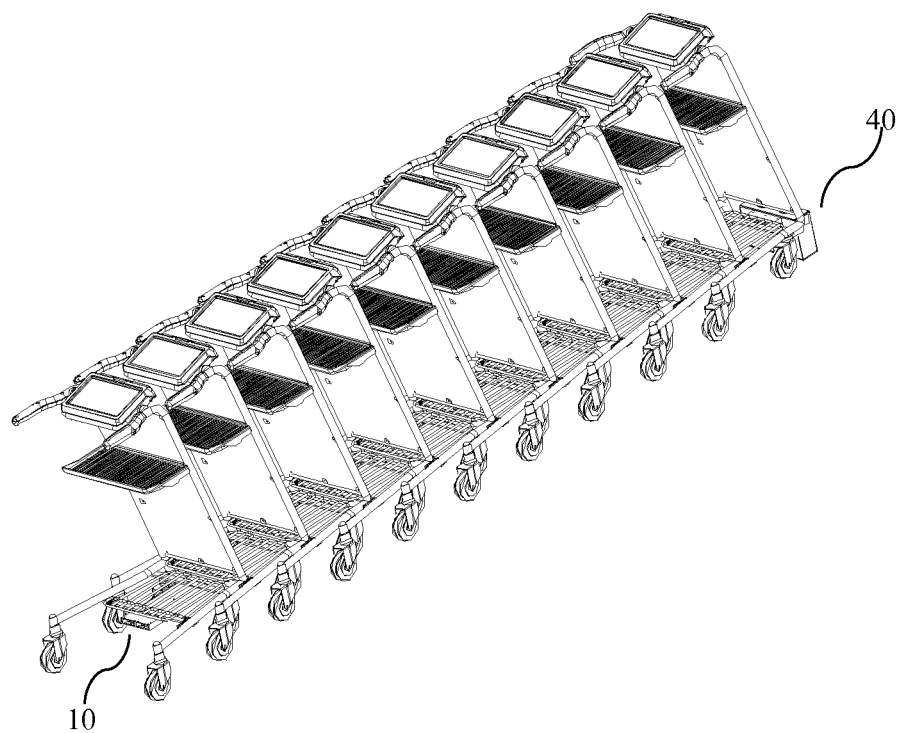
FIG. 5 is a schematic view showing concatenated trolleys which are charged in a batch according to an embodiment of the invention.

FIG. 5 shows that a number of movable devices such as trolleys are connected in tandem to be charged simultaneously. Under the circumstance as shown in FIG. 5, the electric connectors of each trolley are tandem connected with each other as shown in FIG. 4. In this case, the male plugs of electric connector in the first trolley connect to the female sockets (for example the rated power is 1500 W, 2000 W or 3000 W) of AC/DC conversion device 40 (such as SP-320 series manufactured by Mean Well Enterprises Co., Ltd., Taiwan), so as to connect to the charging power supply through the female sockets. The female sockets may have the same structure with female sockets of the electric connector so as to receive male plugs of the electric connector and effect an electric connection with the electrodes of the male plugs.

The foregoing description and illustration on some embodiments of the invention are an example and the invention is not limited to the exact details shown or described. Any equivalent changes to the above disclosure made by those skilled in the art using technical means available should fall into the scope of the protection of the invention.

The invention claimed is:

1. An electric connector comprising:
   an insulated housing on which a port for connection of conductor wire is provided,
   a male plug provided at one end of the housing and a female socket provided at the opposite end of the housing, the male plug and female socket having an electrode respectively, and
   an electrode slice provided inside the housing and connected with a pair of the male plug and female socket,
   said female socket has an opening being adaptive to accommodate the male plug and effecting a connection of the electrodes of the male plug and female socket which are spliced together, wherein,
   the female socket comprises a reed electrode, the reed electrode comprises a bottom being electrically connected with the electrode slice, and elastic reeds extending from the middle part and two sides of the bottom, the elastic reeds being adaptive to the male plug so that the reed electrode can clamp the electrode of an inserted male plug and form electric connection when the female socket is inserted by a male plug of another electric connector.

2. The electric connector according to claim 1, wherein there are two of the male plugs and two female sockets.

3. The electric connector according to claim 2, wherein the electrode of the male plug is formed by sheet metal having a shape of "C" around a central portion of the male plug.

4. The electric connector according to claim 1, wherein an electrode set formed by an electrode slice inside the housing and a pair of a corresponding the male plug and female socket is insulated from another electrode group formed by another electrode slice inside the housing and a pair of corresponding the male plug and female socket.

5. The electric connector according to claim 1, wherein the interior of the electric connector is integrated with the housing.

6. A movable device comprising a body and a charging unit installed on the body, and an electric connector according to claim 1 installed on the body and connected with the charging unit,
   wherein when a plurality of the movable devices are in a queue, the male plug of the rear electric connector of movable device inserts into the female socket of its front movable device and forms an electric connection.

7. The movable device according to claim 6, wherein the electric connector is installed at the bottom of the body.

8. The movable device according to claim 1, wherein the three elastic reeds that extend from the middle and two sides clamp the electrode of the inserted male plug to form an electric connection when the female socket is inserted by the male plug of the other electric connector.

9. The movable device according to claim 1, wherein the port comprises a connection port for connection of a conductor wire of a charging unit.

\* \* \* \* \*